(12) United States Patent
Okutani et al.

(10) Patent No.: US 6,220,799 B1
(45) Date of Patent: Apr. 24, 2001

(54) MACHINE TOOL

(75) Inventors: Norio Okutani, Nara; Toshiyuki Okada, Katano; Yoshimichi Ishii, Neyagawa, all of (JP)

(73) Assignee: Matsushita Electric Industrial Co.,Ltd., Osaka (JP)

( * ) Notice: Subject to any disclaimer, the term of this patent is extended or adjusted under 35 U.S.C. 154(b) by 0 days.

(21) Appl. No.: 09/180,988

(22) PCT Filed: Jul. 23, 1997

(86) PCT No.: PCT/JP97/02595

§ 371 Date: Nov. 19, 1998

§ 102(e) Date: Nov. 19, 1998

(87) PCT Pub. No.: WO98/04383

PCT Pub. Date: Feb. 5, 1998

(30) Foreign Application Priority Data

Jul. 29, 1996 (JP) .................................... 8-198961

(51) Int. Cl.[7] ............................... B23Q 5/34; B23C 1/06; B23B 47/18
(52) U.S. Cl. .......................... 409/164; 29/26 A; 408/62; 409/134; 409/226; 409/229; 483/3
(58) Field of Search .................... 483/30, 14, 15, 483/3; 29/DIG. 94, DIG. 63, 27 C, 27 R, 26 A, 26 B; 408/62; 409/202, 212, 213, 203, 217, 145, 163, 164, 167, 225, 226, 221, 219, 228, 229

(56) References Cited

U.S. PATENT DOCUMENTS

| | | |
|---|---|---|
| 4,197,769 | 4/1980 | Smith et al. . |
| 4,510,668 * | 4/1985 | Ishida et al. ..................... 409/221 X |
| 4,706,371 | 11/1987 | McMurtry . |
| 4,796,341 * | 1/1989 | Kuhn, II .............................. 29/33 P |
| 5,105,694 | 4/1992 | Smith et al. . |
| 5,205,078 | 4/1993 | Takara et al. . |
| 5,439,431 | 8/1995 | Hessbrueggen ....................... 483/14 |
| 5,678,291 * | 10/1997 | Braun .................................. 29/26 A |
| 5,699,590 * | 12/1997 | Hessbruggen et al. ............. 29/27 C |
| 5,819,395 * | 10/1998 | Paitel .................................... 29/564 |

FOREIGN PATENT DOCUMENTS

| | | | |
|---|---|---|---|
| 3416660 | 11/1987 | (DE) . | |
| 208 811 * | 3/1990 | (JP) ..................................... 409/219 |
| 314 915 * | 6/1991 | (JP) ..................................... 409/219 |

* cited by examiner

*Primary Examiner*—William Briggs
(74) *Attorney, Agent, or Firm*—Jordan and Hamburg LLP

(57) ABSTRACT

A machine tool of small scale, light weight, and low cost, yet accomplishing a high degree of precision in machining. A spindle (2) is encased in a body frame (1) and disposed preferably in such a manner that the spindle (2) is movable along an axial center thereof or Z-axis direction by means of a Z-axis moving means (4). Either Y-axis table (5) or an X-axis table (6), at least being capable of moving along X-axis or Y-axis direction, or both is provided at one end of the spindle (2) on one side of the body frame (1) and arranged to be vertical with respect to the axial center of the spindle (2).

27 Claims, 14 Drawing Sheets

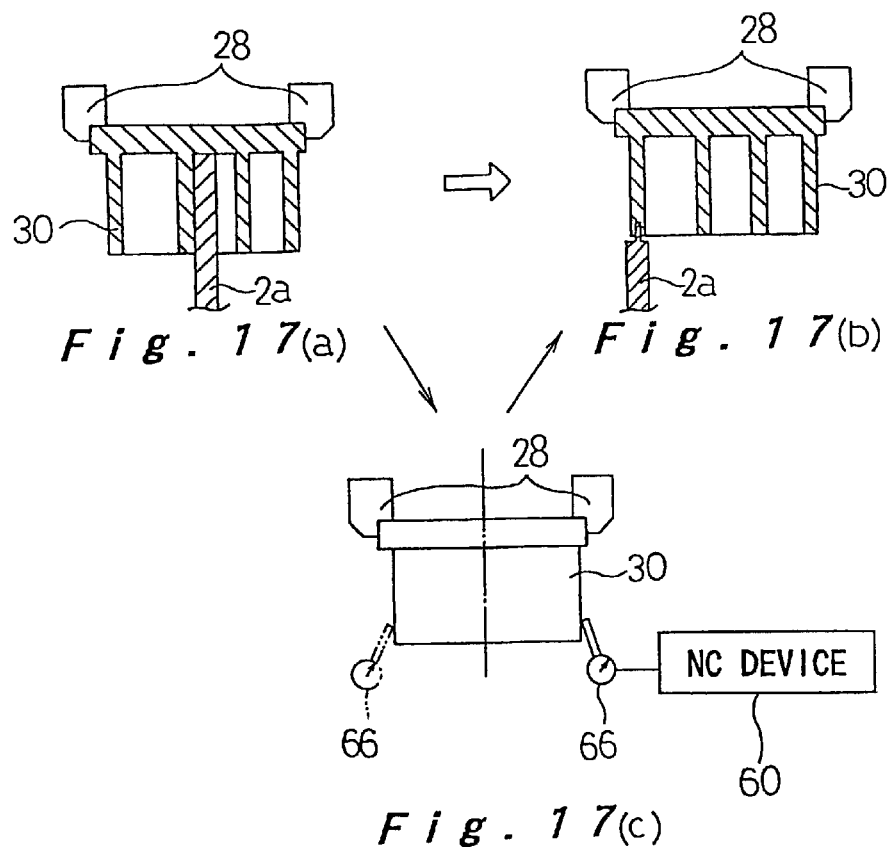
Fig. 17(a)   Fig. 17(b)
Fig. 17(c)
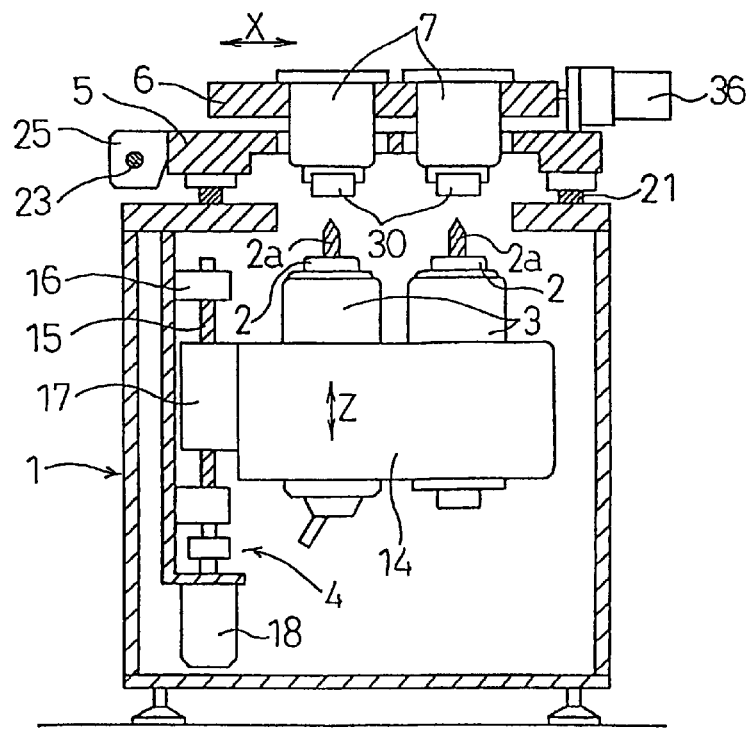
Fig. 18

MACHINE TOOL

TECHNICAL FIELD

The present invention relates to a machine tool.

BACKGROUND ART

In a conventional machine tool with a vertical spindle, the spindle is supported by a column in such a way that the spindle is movable along its axial direction or the Z-axis, and the column is either directly or indirectly supported on a base. In an exemplary arrangement shown in FIG. 21(a), an X-axis table 72 being movable in the X-axis direction is mounted on a base 71, and a column 73 serving as a Y-axis table being movable in the Y-axis direction is mounted on the X-axis table 72. A spindle head 74 is supported by the column 73 movably along the Z-axis, and a work bed 75 is connected to the base 71. In another arrangement shown in FIG. 21(b), an X-axis table 76 serving as a work bed and the column 73 serving as a Y-axis table for movement in the Y-axis direction are mounted on the base 71. The spindle head 74 is supported by the column 73 movably along the Z-axis direction. U.S. Pat. No. 5,439,431 typically discloses such type of machine tool, in which a spindle driven to move in Z-axis direction is mounted on a compound slide (corresponding to the column 73 in FIG. 21(b)) which is moved in X- and/or Y-axis direction. In yet another arrangement shown in FIG. 21(c), an X-axis table 78 serving as a work bed being movable in the X-axis direction is mounted on a Y-axis table 77 for movement in the Y-axis direction, which is disposed on the base 71. A column 79 of an inverted L shape is vertically mounted on the base 71, and a spindle head 80 having a built-in mechanism for movement in the Z-axis direction is mounted to the distal end of the column 79. In a still further example shown in FIG. 21(d), the Y-axis table 77 is mounted on the base 71 for movement in the Y-axis direction, and the X-axis table 78 serving as a work bed is mounted on the Y-axis table 78 for movement in the X-axis direction. A column 81 is vertically mounted on the base 71, and the spindle head 74 is supported by the column 81 movably along the Z-axis.

Other types of machine tools such as the one employing a gate-like column (not shown) or the one having its spindle arranged horizontally have substantially the same configuration as described above.

The spindle head is generally cantilevered by the column in any of the prior arrangements described above. In order to variably determine the positional relationship between the spindle head and the workpiece, the mechanisms that link the spindle head and the work piece are constructed to detour the space therebetween. To accomplish high-speed and highly precise machining, the machine tool must meet two requirements. Firstly, the materials constituting the base, table, column, and other members should be given high rigidity. Secondly, the play between moving parts of each member should be minimized. To meet these requirements, relatively larger members precisely constructed are necessary, causing the entire machine to be larger, heavier, more expensive, and to occupy a larger space in a factory line for installation.

Another problem is attributable to the detoured structure and the large scale of the entire machine. Thermal deflection caused by changes in temperature has greater influence on the mechanisms, adversely affecting the precision of machining.

In view of the foregoing, it is an object of the present invention to provide a machine tool which accomplishes a high degree of precision in machining with minimized size, weight, and cost.

DISCLOSURE OF INVENTION

In order to accomplish the above-said object, a machine tool according to the present invention is characterized in that the spindle is supported at both sides within a stationary box-like body frame which constitutes a main frame of the machine body and located approximately at the center of the machine body, and that an X-axis table and a Y-axis table being respectively movable along X-axis and Y-axis directions are provided on a top face or one of four sides of the body frame and therewith in a plane, which lies orthogonal to the axis of the spindle in such a manner as to be cumulated on one another, the chuck means being mounted on the upper one of the X-axis table and Y-axis table.

Relative positions between the chuck means and the spindle is variably determined by moving the table disposed on one side of the body frame with respect to the axial center of the spindle disposed within the body frame. The mechanism for variably determining the positional relationship between the spindle and a workpiece held by the chuck means is comprised of the body frame and the table on one side thereof in abutment with each other, and includes no roundabout members such as a cantilevered column, providing no spaces between each member. The entire design of the machine tool can be thus compactly constructed with small and light parts yet keeping high rigidity. High-speed and highly accurate machining is thereby accomplished while minimizing the structure in size, weight, and cost. Further, the entire structure of the machine tool can be made approximately symmetrical around the spindle as the axis of symmetry, which restrains adverse effects of thermal deflection caused by changes in temperature which leads to errors in machining. It is to be understood that the axial center of the spindle may be arranged parallel as well as vertical to a horizontal plane.

In the above structure, the spindle is fixed to a Z-axis moving means which is slidably supported on guide rails within the body frame for moving the spindle in Z-axis direction. Since the spindle is movable in only one axial direction, the structure is simplified yet constructed with high rigidity and precision. The workpiece can also be accurately positioned by controlling each table.

The machine tool according to the present invention may further comprise a base plate provided on the top surface or the projected part of the base plate on one side of the body frame, contributing to a compact arrangement of the machine.

The machine tool according to the present invention may further comprise one or more tables disposed above the body frame, wherein the spindle is arranged to have the axial center thereof along a vertical direction and mounted with a cutting tool, and the chuck means is designed to hold the workpiece upside down. As the workpiece is held downward, chips created while machining flow down into an enclosed space in the body frame by gravity and effectively collected.

The spindle may be built in a high-speed motor as a rotary driver thereof and rotatably supported by non-contact type bearings. The machining force can be reduced by the high speed operation of about 40,000 rpm, and each member constituting the machine is required to have less rigidity yet assuring precise machining. The entire structure of the machine can be thereby minimized in size, weight, and cost.

The non-contact type bearings may be magnetic radial bearings. The spindle can be thereby readily and accurately supported by the control of electromagnet.

The machine tool may further comprise a means of correcting any errors in machining the workpiece by adjusting supporting position of the spindle by the non-contact type bearings. Errors created by inertial force when the X-axis or Y-axis table changes its directions or caused by backlash are preliminarily measured, so that the correction is made by the non-contact type bearings and it is unnecessary to correct numerical control data for machining.

A chuck rotating means may be provided to cause the chuck means to rotate around the axial center thereof. Circular parts of the workpiece can be precisely machined by rotating the workpiece instead of controlling the movement of the X-axis or Y-axis table.

The body frame may be constructed to have a U-shaped cross-section. The spindle or the rotary driver can be easily accessed from an opened side of the body frame for assembly or maintenance.

The machine tool may be provided with a position sensor for detecting positions of the workpiece held by the chuck means. When the workpiece is machined by several different machine tools in a plurality of machining processes, the workpiece can be precisely held by detecting any errors of the machine itself or errors in holding the workpiece by the sensor.

The machine tool may further have a cutting oil applying means for ejecting cutting oil from a side of the opening toward the workpiece being machined, and a collecting hopper for gathering the cutting oil and chips flowing down thereto. The cutting oil can be assuringly supplied to the workpiece being machined, as well as the cutting oil and chips can be effectively collected.

A splash guard hood may be further provided around the chuck means for causing the cutting oil splashing around the workpiece being machined to flow down into the collecting hopper. The cutting oil and chips can be thereby effectively collected.

The machine tool according to another embodiment of the present invention may have a sealing means to seal a gap between the splash guard hood and the collecting hopper while allowing a respective movement with each other therebetween. It is thus prevented that the cutting oil and chips splash around through the gap between the splash guard hood and the collecting hopper. When used in combination with a vacuum suction means, collecting capacity is further enhanced by the vacuum pressure.

A collecting fluid applying means may be further provided for ejecting a collecting fluid toward into the collecting hopper, which is connected to a collecting duct. The cutting oil and chips can be smoothly collected by the fluent collecting fluid.

The collecting hopper may be arranged eccentrical with respect to the opening, and the collecting fluid applying means may be disposed in such a way that the collecting fluid is blown from a side where a gap between the periphery of a rotary driver for rotating the spindle and the collecting hopper is narrow toward a widely-gapped side, where the collecting duct is connected to the collecting hopper, so as to even more smoothly collecting the cutting oil and chips.

The collecting duct connected to the collecting hopper may be further connected to a vacuum suction means. The cutting oil and chips can be assuringly collected without leaving any residuals thereof.

The cutting oil applying means may comprise three or more cutting oil ejecting nozzles disposed to surround the workpiece being machined. Cutting oil can be thereby supplied to every part of the workpiece.

An on-off controller may be further provided for controlling ejection of the cutting oil from each cutting oil ejecting nozzle in accordance with the position of the workpiece. As it is controlled to select proper nozzles to be effective for blowing out the cutting oil, an oil pump of small scale can supply a sufficient amount of the cutting oil.

In a machine tool according to the present invention, a corner of a given radius is machined by numerical control using a cutting tool designed to machine a corner of the minimum radius. Every cornered part of the workpiece having several different radii can be machined by a single cutting tool, assuring preciseness in machining as it is not necessary to change cutting tools.

According to another embodiment of the present invention, a plurality of spindles may be arranged in the body frame, and a plurality of chuck means may be disposed on the table(s). Productivity is thereby increased as the workpiece can be simultaneously machined in plurality.

Also, the spindle may be provided in the body frame in singularity while a plurality of the chuck means are disposed on the table(s). This allows a plurality of workpieces to be fed to or received from the chuck means. Productivity is thereby increased as the time for exchanging workpieces is reduced.

Alternatively, a plurality of spindles may be arranged in the body frame while the chuck means is disposed on the table(s) in singularity. Several machining processes can be carried out in a single machine tool, whereby productivity is increased.

Further, a pair of chuck means may be disposed in the X-axis table in parallel with each other along the Y-axis direction, and the Y-axis table may be arranged to be movable between farthest ends where one chuck means positions just above the opening in the base plate, the base plate having a pair of another openings through which a workpiece if removed from and fed to the other chuck means when the Y-axis table is located at a given farthest end. While a workpiece held by one chuck means is being machined, another workpiece can be removed from and fed to the other chuck means, which reduces the time for exchanging workpieces, thereby increasing productivity.

BRIEF DESCRIPTION OF DRAWINGS

FIG. 17 is an explanatory view showing a machining process of a fourth embodiment of the present invention.

FIG. 18 is a vertical sectional view of a machine tool according to a fifth embodiment of the present invention.

BEST MODES FOR CARRYING OUT THE INVENTION

Preferred embodiments of the invention will be hereinafter described with reference to the accompanying drawings.

Figure 1:
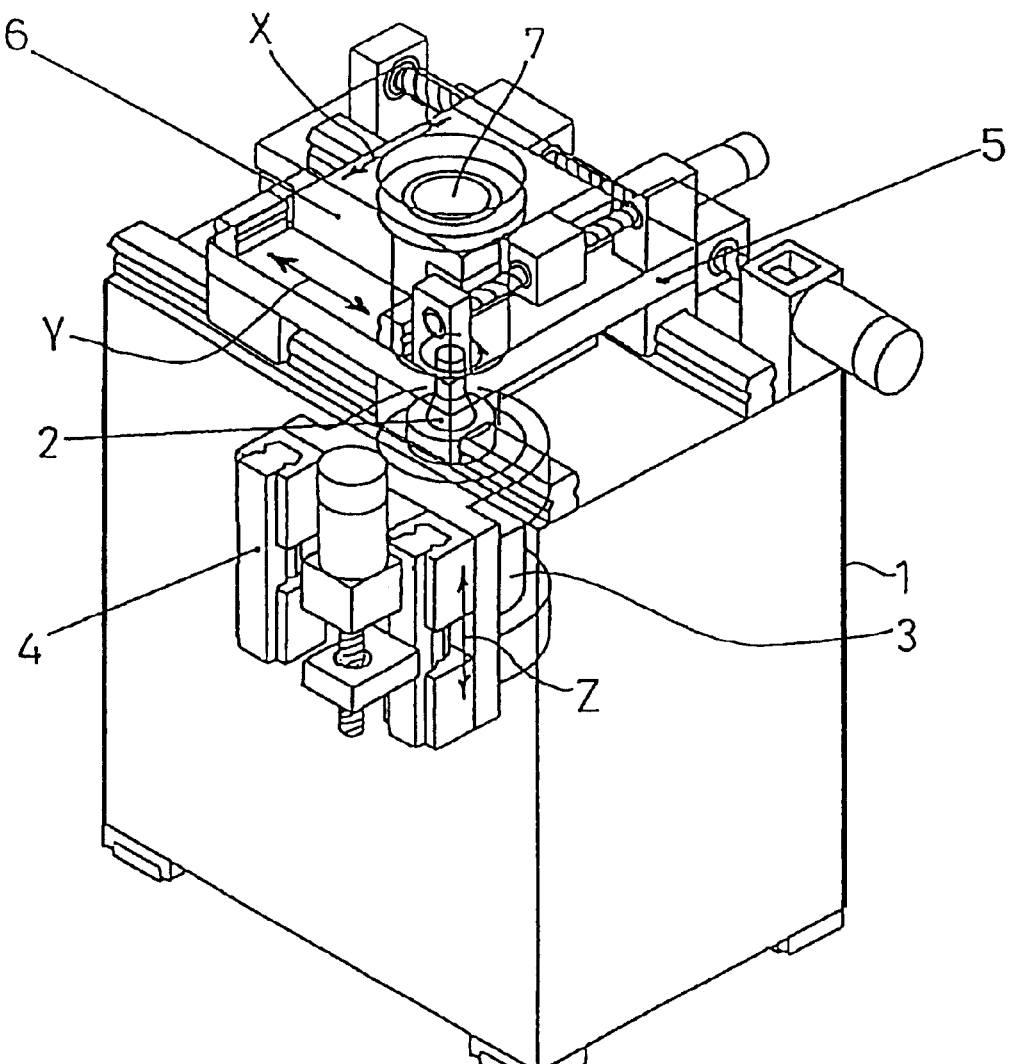
FIG. 1(a) is a schematical perspective view showing the entire configuration of a machine tool according to the present invention.
FIG. 1(b) is a control block diagram thereof.
Figure 1:
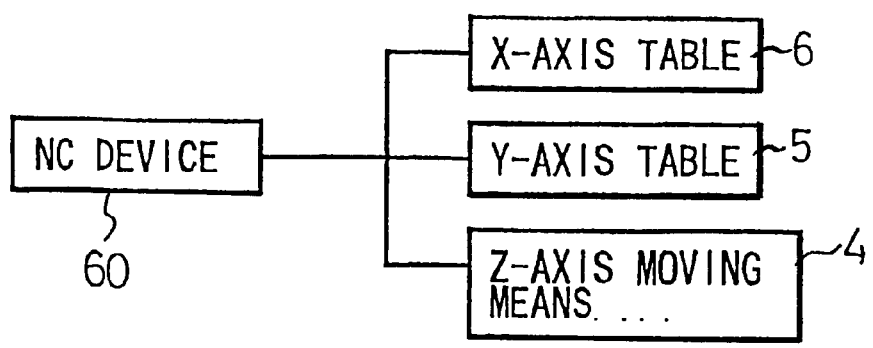

FIG. 1(a) is a perspective view which schematically shows the entire configuration of the present invention. In FIG. 1(a), a box-like body frame 1 of approximately a rectangular parallelepiped encases a spindle 2 standing upright along a Z-axis perpendicular to a horizontal direction, a rotary driver 3 for driving the spindle 2, and a Z-axis moving means 4 for moving the spindle 2 and its rotary driver 3 along the Z-axis direction. On the top surface of the body frame 1 is a Y-axis table 5 being movable along the Y-axis, on which an X-axis table 6 is mounted for movement along the X-axis. A chuck means 7 for holding a workpiece is disposed on the X-axis table 6. The Z-axis moving means 4, the Y-axis table 5, and the X-axis table 6 are operated through a numerical control device 60 as shown in FIG. 1(b).

Figure 5:
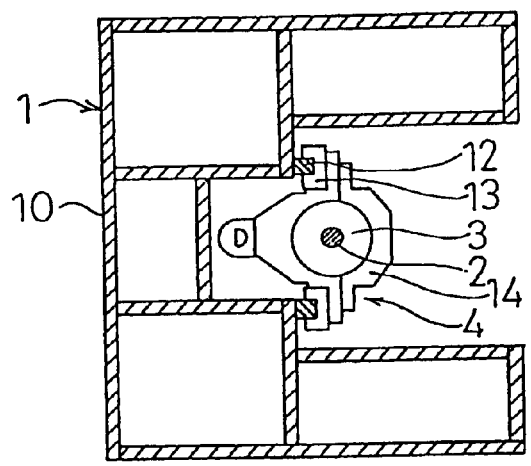
FIG. 5 is a plan view of a horizontal section of a body frame in the embodiment.
Figure 6:
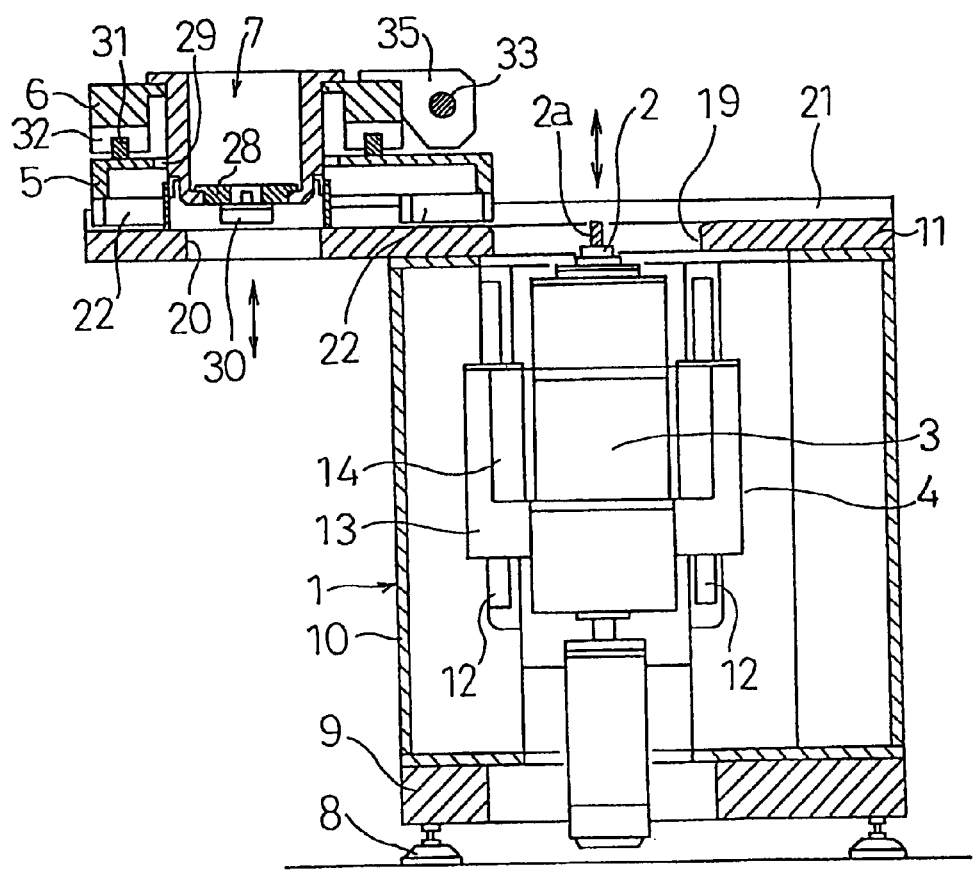
FIG. 6 is a vertical side elevation view showing a modification of the embodiment.

Referring now to FIGS. 2 to 6 showing more detailed configurations of the first embodiment, the body frame 1 comprises a main frame 10 cubically constructed by plates and placed on top of a bottom frame 9, which has adjustable support legs 8 on the bottom at all four corners. A base plate 11 is placed on top of the main frame 10. As shown in FIG. 5, a horizontal sectional view of the main frame 10 appears approximately U-shaped. A high-speed motor as the rotary driver 3 including the build-in spindle 2 therein is approximately centered in the main frame 10 and fixed to the Z-axis moving means 4. Since the main frame 10 is constructed to have a U-shaped cross section, i.e., as one of the four sides of the frame 10 is opened, the rotary driver 3 and the Z-axis moving means 4 are readily accessed for assembling operation or maintenance.

The Z-axis moving means 4 comprises a movable member 14 slidably supported via a slide block 13 by a guide rail 12 along the Z-axis direction. A screw feed shaft 15 is disposed parallel to the guide rail 12 and rotatably supported by bearings 16 at both ends thereof. A nut member 17 fixedly coupled to the movable member 14 is mated with the screw feed shaft 15, which is driven to rotate by a Z-axis drive motor 18. As the screw feed shaft 15 is rotated, the nut member 17 is moved along the screw feed shaft 15, causing the rotary driver 3 fixedly mounted on the movable member 14 to slide along the Z-axis.

The base plate 11 has an opening 19 opposed to the spindle 2, through which the machining operation is carried out. The base plate 11 is laterally extended from the main frame 10 toward one direction along the Y-axis by an appropriate length, and the projected part has an opening 20 for passing through a workpiece 30. It will be further advantageous if the base plate 11 is extended widely enough to be able to hold the Y-axis table 5 thereon, in which case the space above the opening 19 on the main frame 10 will be more broadly opened, which will facilitate the exchanging operation of a cutting tool 2a at the tip of the spindle 2.

The Y-axis table 5 is slidably supported via a slide block 22 by a pair of guide rails 21 along the Y-axis direction arranged on either side of the base plate 11. A screw feed shaft 23 is provided in parallel with the guide rails 21 at one side of the base plate 11, and rotatably supported by bearings 24. A nut member 25 fixed to the Y-axis table 5 is mated with the screw feed shaft 23, which is driven to rotate by a Y-axis drive motor 26 to cause the Y-axis table 5 to move along the Y-axis direction.

The X-axis table 6 is slidably supported via a slide block 32 by a pair of guide rails 31 along the X-axis direction arranged on fore and back ends of the Y-axis table 5. A screw feed shaft 33 is provided in parallel with the guide rails 31 at the back end of the Y-axis table 5, and rotatably supported by bearings 34. A nut member 35 fixed to the X-axis table 6 is mated with the screw feed shaft 33, which is driven to rotate by an X-axis drive motor 36 to cause the X-axis table 6 to move along the X-axis direction.

The chuck means 7 is mounted approximately in the middle of the X-axis table 6 to pass therethrough to extend downwardly, and comprised of a support cylinder 27 and a chuck 28 for holding the workpiece 30 coupled to the bottom thereof. The support cylinder 27 extends through an opening 29 formed in the Y-axis table 5 to be elongated in the X-axis direction to position the bottom surface of the workpiece 30 held by the chuck 28 just above the top surface of the base plate 11. When the Y-axis table 5 is brought to the farthest end on the projected part of the base plate 11 extending laterally from the main frame 1, the chuck 28 comes to position just above the opening 20, through which the workpiece 30 is fed and taken out.

Figure 7:
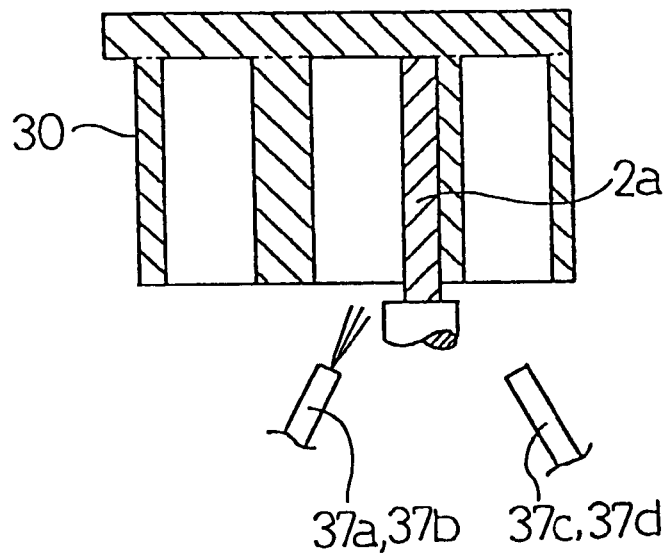
FIG. 7 is a vertical sectional view showing a workpiece machining unit of the embodiment.
Figure 8:
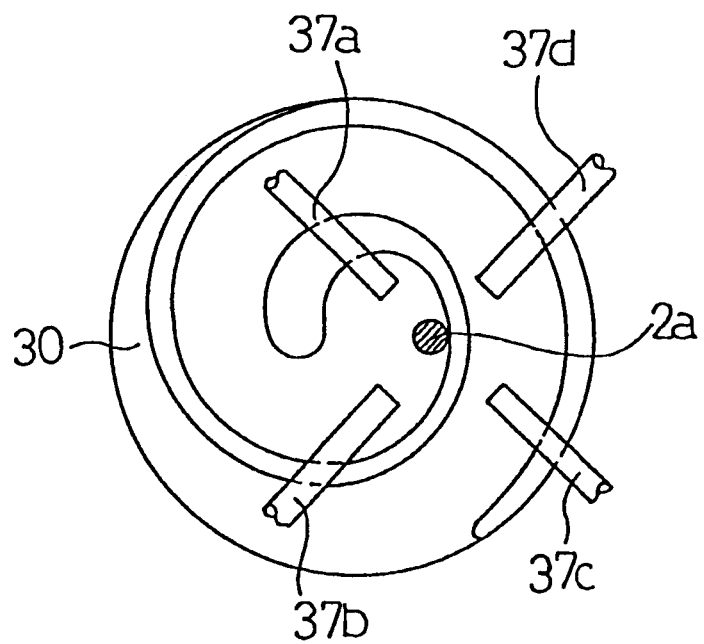
FIG. 8 is a bottom view thereof.
Figure 9:
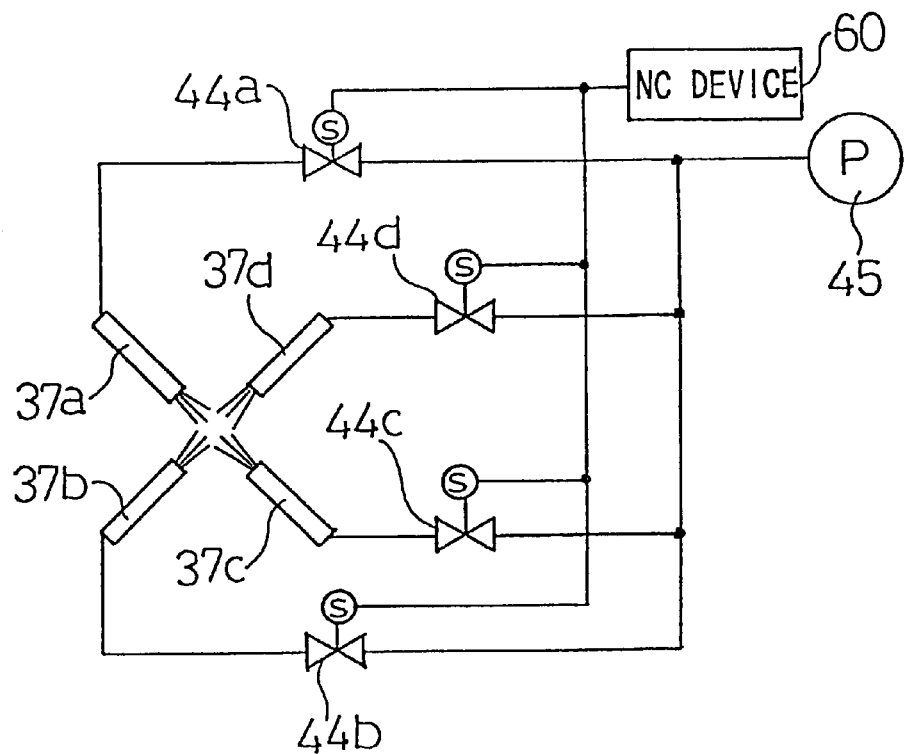
FIG. 9 is an explanatory view showing an arrangement of a cutting oil supply control unit for supplying cutting oil to nozzles in the embodiment.

The workpiece 30 in this embodiment is a scroll vane made of aluminum alloy casting or cast iron for use in a rotary compressor as can be seen from FIGS. 7 and 8. The cutting tool 2a is an end mill for machining the vane. The workpiece 30 is held upside down by the chuck 28 and is machined by the end mill 2a from below.

Figure 2:
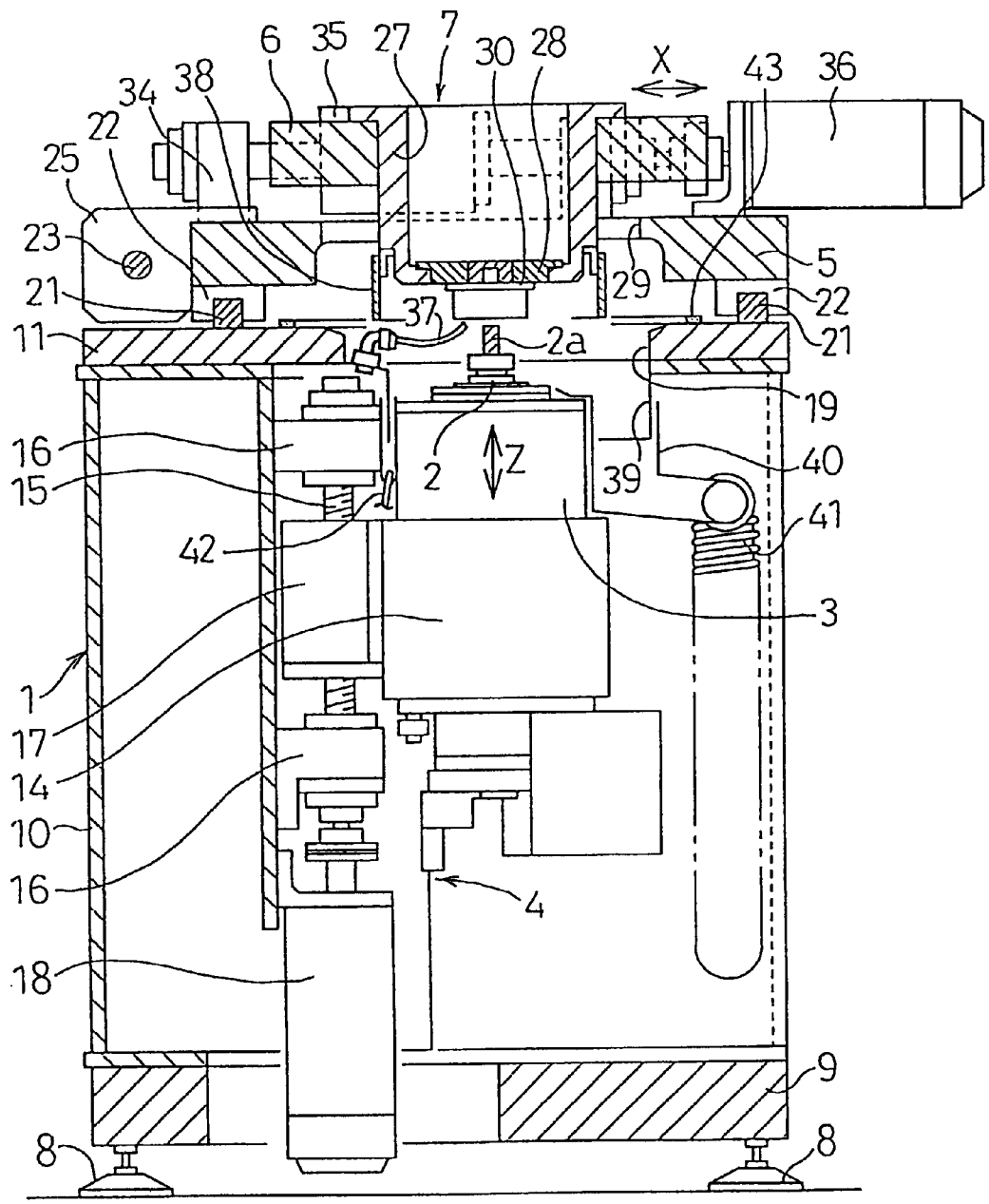
FIG. 2 is an elevational vertical section view thereof.
Figure 3:
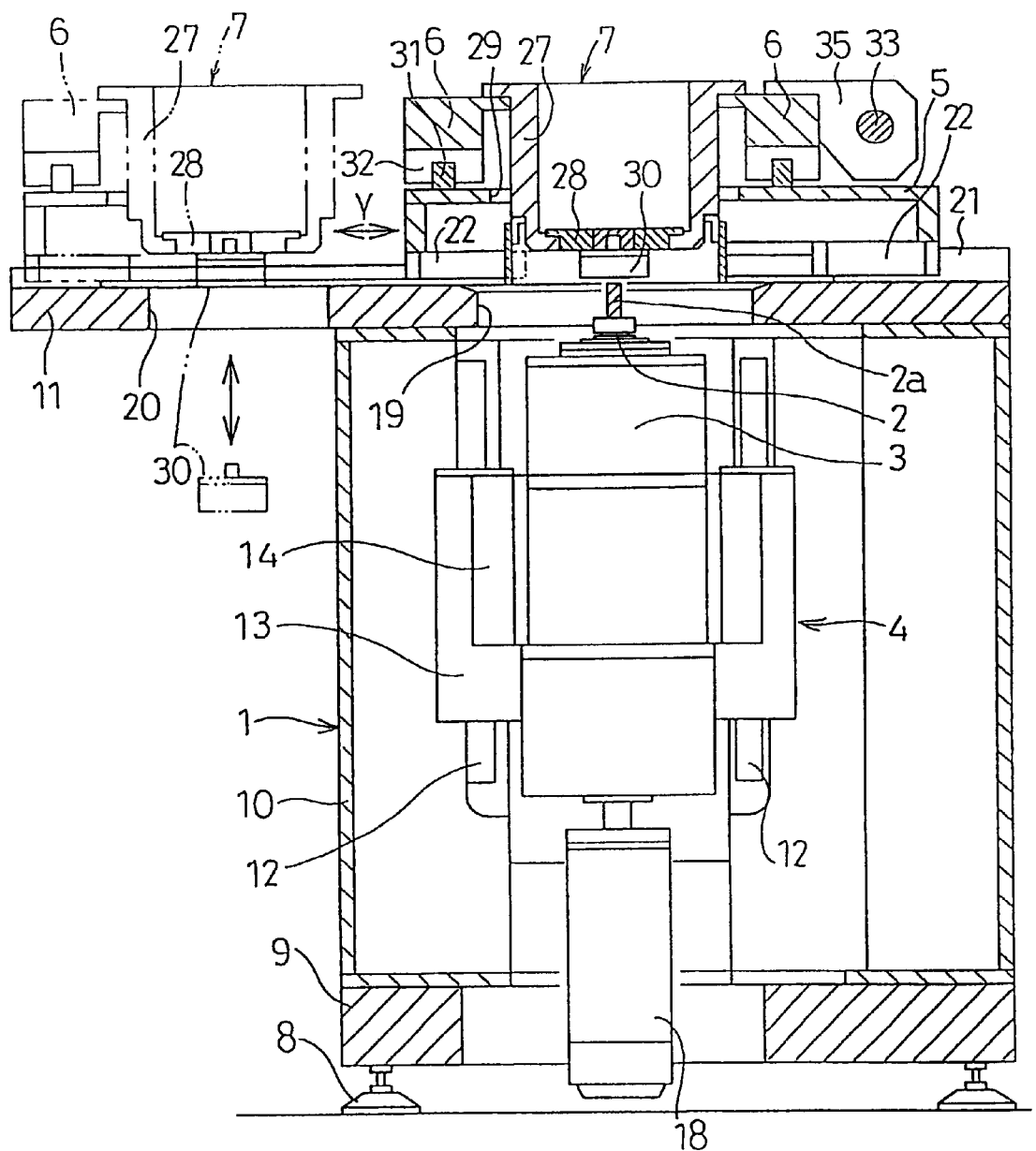
FIG. 3 is a vertical side elevation view thereof.
Figure 4:
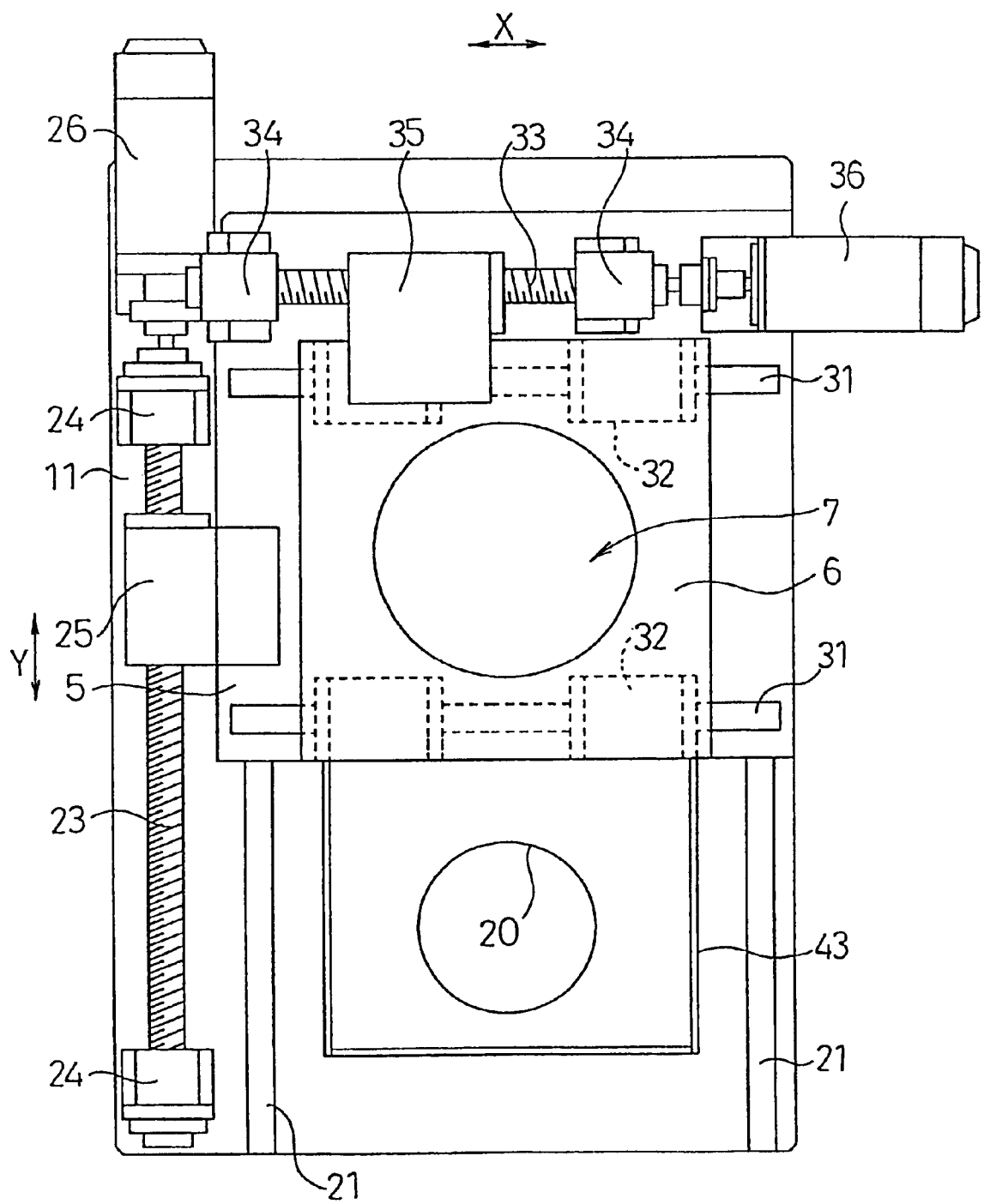
FIG. 4 is a top plan view thereof.

Three or more cutting oil nozzles 37 (four nozzles 37a, 37b, 37c, 37d in this embodiment) are disposed at an approximately equal distance in the vicinity of the opening 19 in the base plate 11 as shown in FIGS. 7 and 8, to eject cutting oil to the workpiece 30 being machined by the cutting tool 2a at the tip of the spindle 2. FIG. 2 shows only one of the nozzles in order to simplify the illustration. By providing at least more than three cutting oil nozzles 37 around the workpiece 30, it becomes possible to apply the oil to every part of the workpiece 30.

Each of the four cutting oil nozzles (37a to 37d) is connected to an oil pump 45 through four control valves 44a–44d, respectively. The control valves 44a–44d are controlled by the numerical control device 60 to open and close for supplying oil to the desired one of the cutting oil nozzles 37a–37d depending on where the workpiece 30 being machined positions. Since the oil is ejected only from effective nozzles properly selected, the oil pump 45 of small size can supply a sufficient amount of cutting oil.

Referring again to FIG. 2, a splash guard hood 38 is provided to a skirt of the support cylinder 27 to hang above the top surface of the base plate 11. Extending downwardly from the opening 19 is an upper cylinder 39 of a collecting hopper 40, which is disposed to surround the rotary driver 3. The collecting hopper 40 is either coupled to or connected by a bellow to the upper cylinder 39 to be movable with respect to each other, and connected to a collecting duct 41 extending to the outside from a lower part of the body frame 1. The collecting duct 41 is further connected to a vacuum suction means, by which cutting oil and chips are discharged. The upper cylinder 39 and the collecting hopper 40 may be uniformly constructed, surrounding and allowing the rotary driver 3 to vertically move therein.

The collecting hopper 40 and its upper cylinder 39 are arranged eccentrically with respect to the rotary driver 3. An air blow means 42 for blowing a mixture of cutting oil and chips gathered in the collecting hopper 40 toward the collecting duct 41 is disposed at a side where a gap made between the periphery of the rotary driver 3 and the surrounding collecting hopper 40 is narrower, from where the air is ejected toward the other side where the gap is wider, so as to effectively collect and discharge the cutting oil and the chips.

Cutting oil may also be blown out in the above-described way instead of the air. The air may be blown into the collecting hopper 40 in a tangential direction to create a whirl therein to gather the mixture of cutting oil and chips. In order to prevent the cutting oil from splashing out through a gap at the bottom of the splash guard hood 38, a weir 43 is provided on the base plate 11, which is formed to be a large rectangle so as to avoid interference with the splash guard hood 38 when the Y-axis table 5 is moved toward the projected part of the base plate 11.

Figures 10A, 10B:
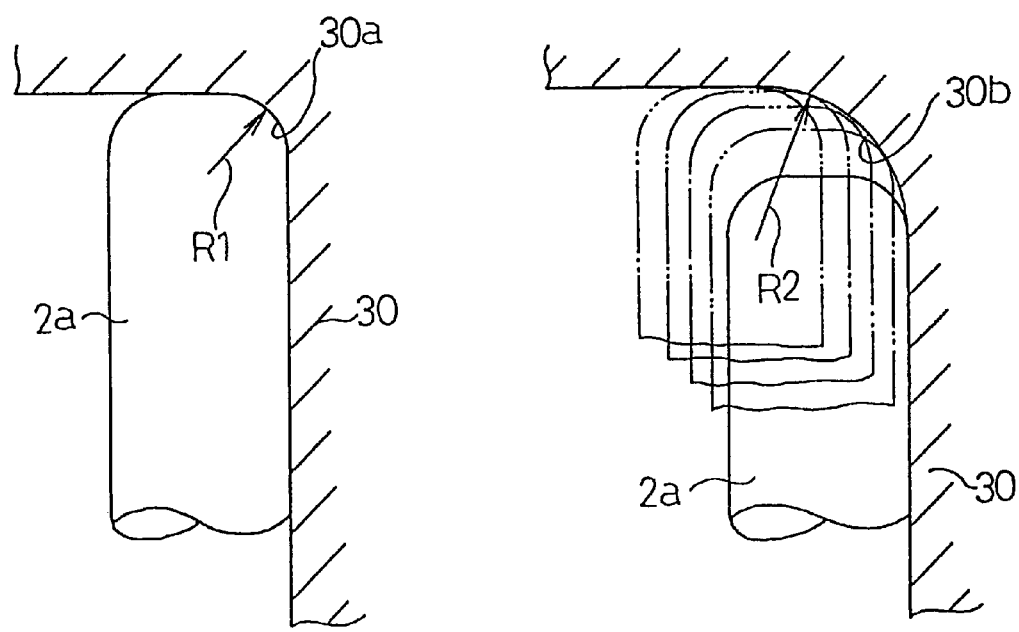
FIG. 10 is an explanatory view of a machining process of a cornered part of a workpiece in the embodiment.

As shown in FIG. 10(*a*), the corner radius of the cutting tool 2a is made equal to a radius R1 of the minimum radius corner 30a of the workpiece 30, in order to machine all parts of the workpiece 30 including the corners with different radius values with the single cutting tool 2a. When machining a corner 30b with a larger radius R2, the Z-axis drive motor 18 and the Y-axis drive motor 26 or the X-axis drive motor 36 are controlled by the NC device 60 to cause the cutting tool 2a along the radius R2 of the corner 30b as shown in FIG. 10(*b*).

Figure 11:
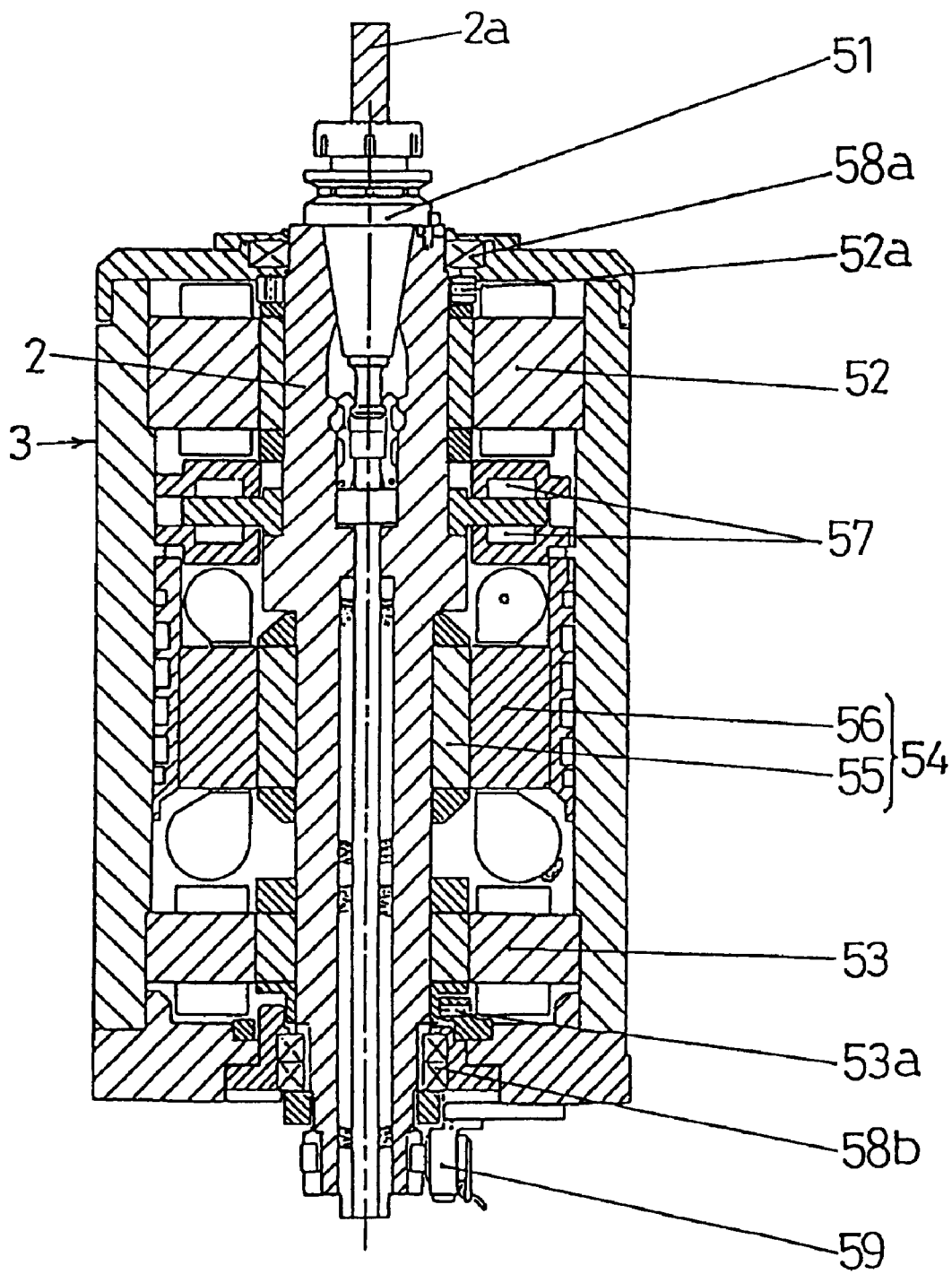
FIG. 11 is a vertical sectional view showing a spindle and a rotary driver of the embodiment.

The rotary driver 3 comprises a high-speed motor with the spindle 2 as its axis of rotation as shown in FIG. 11. A tool holder 51 supporting the cutting tool 2a is fixedly mounted at the top of the spindle 2. The upper and lower ends of the spindle 2 are supported by magnetic radial bearings 52 and 53. Numerals 52a and 52b denote sensors for controlling the magnetic radial bearings 52 and 53, respectively. A motor 54 is comprised of a rotor 55 fixed to the middle part of the spindle and a stator 56. A magnetic thrust bearing 57 is mounted below the upper magnetic radial bearing 52, and protective bearings 58a and 58b are further provided for supporting the spindle 2 when the spindle is at a halt or during its low-speed rotation. Numeral 59 denotes an encoder disposed at the lower end of the spindle 2.

Figure 12A:
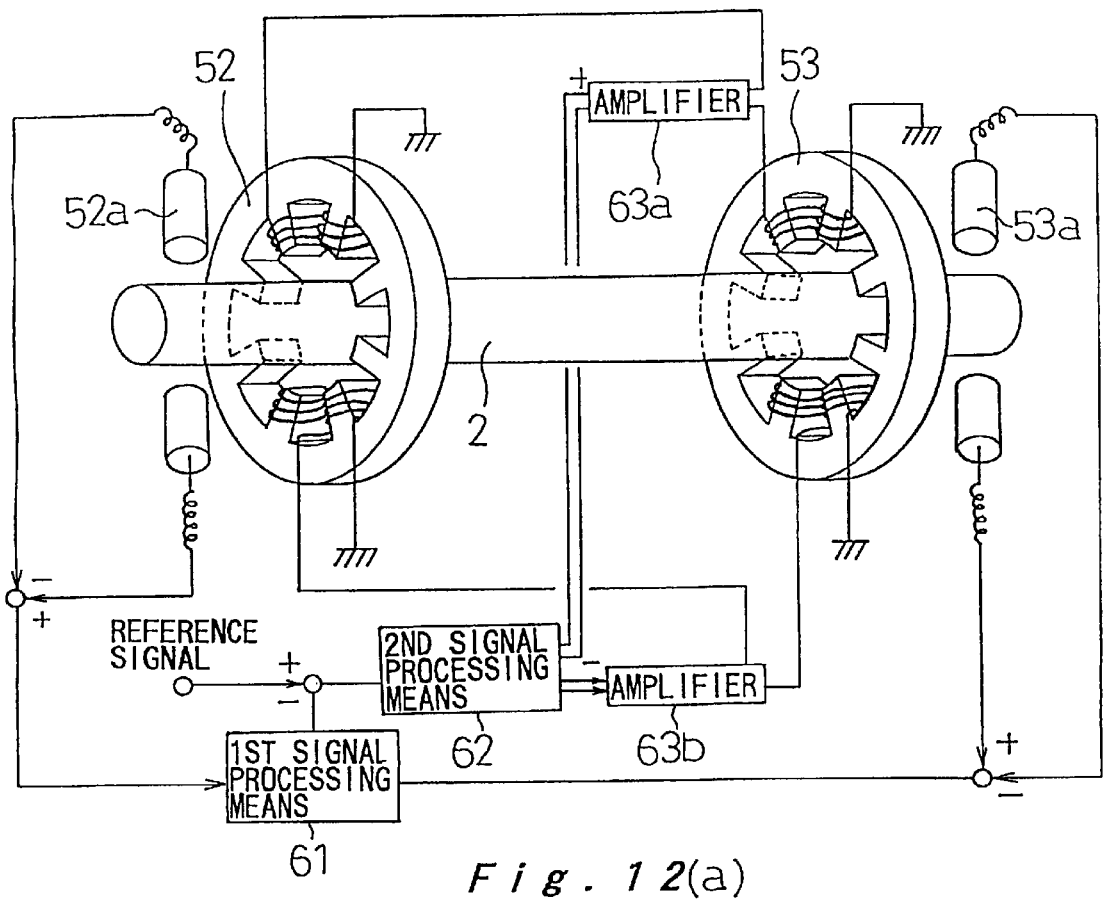
FIG. 12 is an explanatory view showing an arrangement of a magnetic radial bearing of a rotary driver and its controller of the embodiment.
Figure 12B:
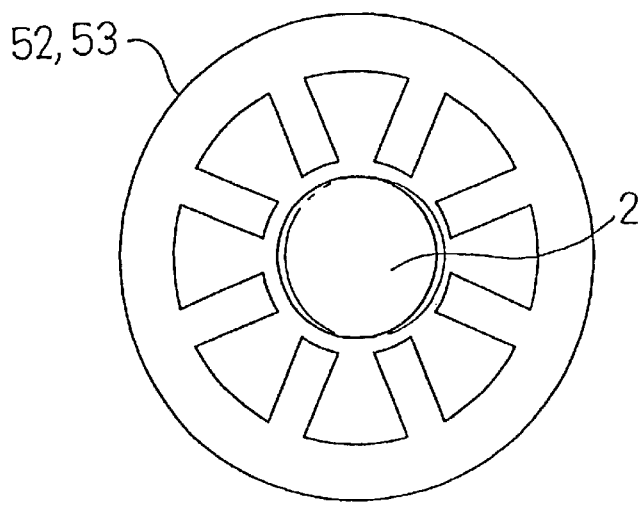

The magnetic radial bearings 52, 53 are constructed with magnetic rings to have magnetic attraction evenly thereon, so as to support the spindle 2 floated in the middle thereof as shown by a solid line in FIG. 12(*b*). When the spindle 2 is decentered as shown by a phantom line, the amount of displacement from the axial center of the bearings is detected by the sensors 52a, 53a, which is converted into signals corresponding to reference signals through a first signal processing means 61. Control signals, given by subtracting the converted signals from the reference signals, are then inputted to a second signal processing means 62, which converts the inputted control signals into magnetic attraction control signals. The magnetic attraction of the magnetic radial bearings 52, 53 are controlled by the magnetic attraction control signals through amplifiers 63a, 63b, to relocate the spindle 2 in the center of the bearings. As can be seen from the arrangement described above, it is also possible to position the spindle 2 at any given eccentrical location by varying the reference signals.

Figure 13:
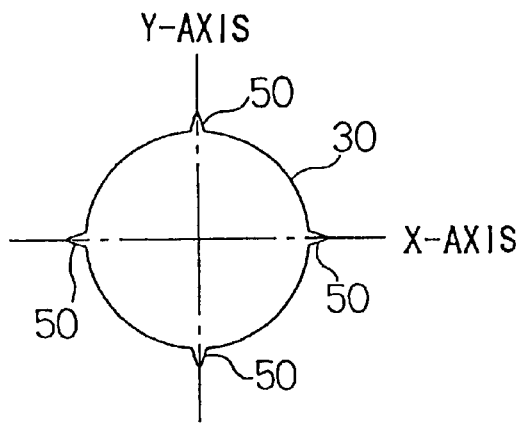
FIG. 13 is an explanatory view showing how a quadrant projection is created during machining operation in the embodiment.

Since this embodiment employs the X-axis table 6 and the Y-axis table 5 movable along the X- and Y-axes controlled by the numerical control device 60 to determine the positions of the workpiece 30 which is machined by the cutting tool 2a positioned along the Z-axis direction, an inertial force or adverse effects of a backlash when the X- or Y-axis 5, 6 changes the direction sometimes causes an error in machining, creating projections at both ends of the workpiece 30 along the X- and Y-axes as shown in FIG. 13. This error is called a "quadrant projection" 50, as the projections are usually created at the boundaries of adjacent quadrants in an X-Y coordinate.

Figure 14:
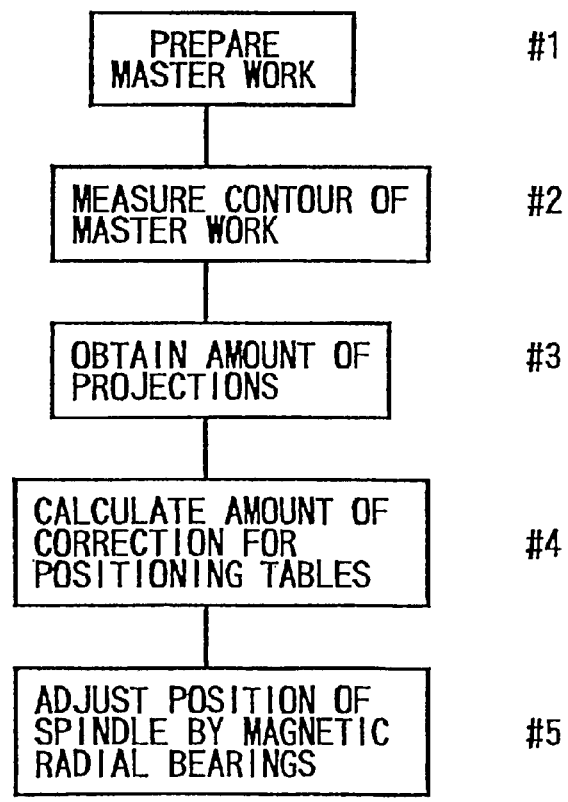
FIG. 14 is a flow chart of controlling the radial magnetic bearings to prevent the quadrant projection in the embodiment.

To prevent such a quadrant projection 50, the machining operation according to this embodiment is carried out in a manner hereinafter described referring to FIG. 14. Firstly, a master work is prepared in advance at step #1, and the surface contour of the master work is measured at step 2. The amount of each quadrant projection 50 is sampled at step 3, from which the amount of correction necessary for positioning the X-axis table 6 and the Y-axis table 5 for machining is calculated at step 4. At step 5, the workpiece 30 is machined, and where the quadrant projection 50 is created, the position of the spindle 2 is adjusted by the magnetic radial bearings based on the amount of correction calculated at step 4. It is thus possible to prevent the quadrant projections 50 by simply decentering the supporting position of the spindle 2 by the magnetic radial bearings. The operation is thereby simplified as it is no longer necessary to correct the numerical control data at each point where the X- or Y-axis table changes its direction, yet accomplishing highly precise machining. The method of correcting errors by adjusting the supporting position of the spindle 2 by the magnetic radial bearings 52, 53 has been described for eliminating the quadrant projections 50 in this embodiment, but this method can also be applied to correct the errors in surface contour of the workpiece 30 caused by lead errors of the screw feed shafts 23, 33 or errors in rectilinear movement of the guide rails 21, 31.

The operation of machining the workpiece 30 will be hereinafter described. Firstly, the Y-axis table 5 is positioned at the projected part of the base plate 11 laterally extending from the body frame 1 as shown by a phantom line in FIG. 3 or in FIG. 6. The workpiece 30 is fed to the chuck 28 and received therefrom by a relocating means (not shown) as shown by an arrow. After a workpiece 30 which has been machined is forwarded to a transfer means (not shown) disposed below the projected part of the base plate 11, a new workpiece 30 is positioned just under the opening 20 and transferred to the chuck 28 by the relocating means.

The Y-axis table 5 is then moved to a predetermined position above the body frame 1, where the Y-axis table 5 and the X-axis table 6 are positioned so that the machining of the workpiece 30 can be started at a position just above the axial center of the spindle 2. The spindle 2 is rotated at high speed of 4000 rpm and at the same time lifted upward by the Z-axis moving means 4 for starting the machining operation of the workpiece 30 by the cutting tool 2a at the tip of the spindle 2. The movements of the Y-axis table 5, the X-axis table 6, and the Z-axis moving means 4 are controlled by the numerical control device 60 to accurately machine the workpiece 30 in accordance with a predetermined machining configuration.

When the machining is finished, the spindle 2 is descended by the Z-axis moving means 4, and the Y-axis table 5 is returned to the projected part of the base plate 11 laterally extending from the body frame 1. The workpiece 10 which has been machined is taken out therefrom and a new workpiece 10 is chucked as described above. The operation of machining is carried out by repeating these steps.

As set forth above, the machine tool according to the present invention is constructed with high rigidity in a compact design by disposing a high-speed motor as the rotary driver 3 having the built-in spindle 2 within the body frame 1 in such a way that the spindle 2 is movable along the Z-axis direction, thereby realizing high-speed and highly precise machining while keeping the entire configuration of the machine tool to be small, contributing to a lower cost and less space for installation.

Since the spindle 2 is rotatably supported by non-contact bearings comprising the magnetic radial bearings 52, 53, a high-speed machining operation as fast as 4000 rpm can be carried out. It is thus possible to lessen the rigidity of the body frame, base flame, and each table, since the machining force required is reduced as the speed of operation increases, further contributing to a more compact design manufactured at a lower cost.

The spindle is disposed perpendicular to a horizontal plane and constructed to be movable only along the Z-axis direction. This enables the members such as the splash guard hood 38 or the collecting hopper 40 for collecting cutting oil and chips to be vertically disposed. The splash guard hood 38 is mounted around the chuck 28, the upper cylinder 39 of the collecting hopper 40 extends from the opening 19 of the base plate 11, and the collecting hopper 40 is disposed to surround the spindle 2 moving along the Z-axis direction. The cutting oil and the chips thus smoothly flow downwardly by gravity into the collecting hopper 40 disposed lowermost and can be effectively collected and processed by such a simple configuration.

Figure 15:
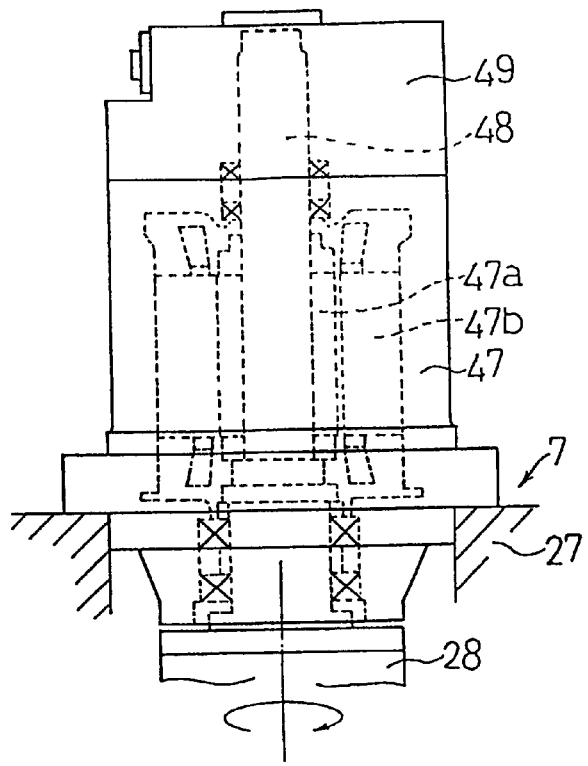
FIG. 15 is a front view showing a chuck rotating means of a second embodiment of the present invention.

The method of eliminating the quadrant projections 50 is embodied by decentering the supporting position of the spindle 2 by the magnetic radial bearings 52, 53 in this embodiment, but this method may also be modified as shown in FIG. 15. As can be seen, the chuck means 7 is provided with a chuck rotating means 47 to cause the chuck 28 to rotate around the axial center thereof. The chuck rotating means 47 comprises a drive motor arranged concentrically with the support cylinder 27, having a rotation axis 48 with the chuck 28 fixed to the bottom end thereof. Numerals 47a and 47b denote a rotor and a stator of the drive motor, respectively, and the numeral 49 represents a sensor unit for detecting the position and speed of rotation.

The above described arrangement enables the workpiece 30 to be machined by the cutting tool 2a while rotated around its axial center by the chuck rotating means 47. Any circled parts of the workpiece 30 can be thereby precisely machined without quadrant projections 50.

Figure 16:
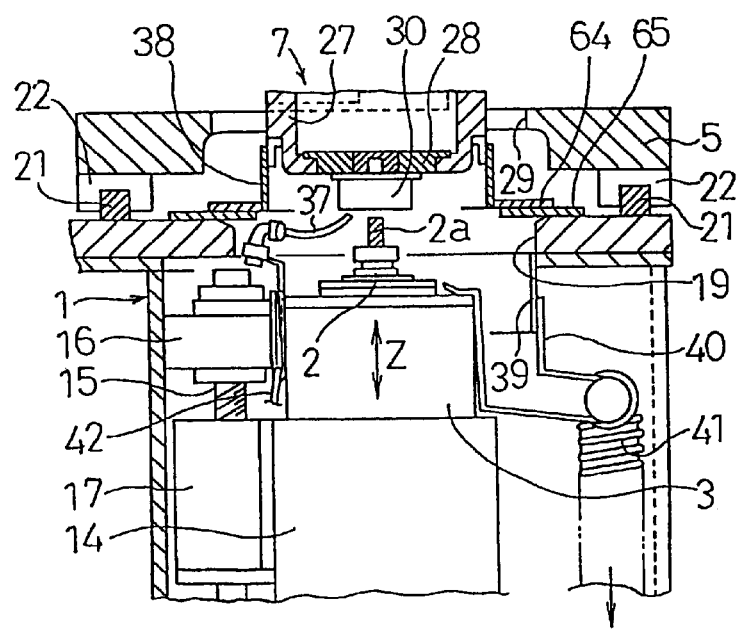
FIG. 16 is a vertical sectional view showing a cutting oil collecting unit of a third embodiment of the present invention.

In the above-described first embodiment, the weir 43 provided on the base plate 11 to surround the splash guard hood 38 broadly enough not to interfere therewith has been shown as an example of an arrangement to prevent the cutting oil and the chips from scattering. Since there is a gap between the splash guard hood 38 and the upper cylinder 39 of the collecting hopper 40, sometimes it cannot be fully prevented that the cutting oil and the chips are splashed through the gap over to the base plate 11. FIG. 16 shows another arrangement for prevention of such scattering, in which an annular seal plate 64 is provided at the skirt of the splash guard hood 38, and a seal frame 65 is disposed above and along the circular opening 19 of the base plate 11 which is slidable with the annular seal plate 64 while keeping the sealing performance therebetween. The sealing members 64, 65 do not obstruct the movement of the chuck means 7 and the splash guard hood 38, yet assuringly seal the gap between the splash guard hood 38 and the upper cylinder 39 of the collecting hopper 40.

The cutting oil and the chips created during the machining operation can be thereby prevented from scattering around and be effectively collected. Further, such sealing members 64, 65 help prevention of vacuum leakage when used in combination with the collecting duct 41 connected to the vacuum suction means (not shown), and enhances the effect of vacuum suction for faster and more effective collection of the oil and chips.

It has been basically described that a new workpiece 30 is fed and machined one after another in the machine tool of the present invention, however, as shown in FIGS. 17(a)–(c), it is also possible to feed a workpiece 30 having been machined by a different machine tool in a proceeding process shown in FIG. 17(a) to another machine tool as indicated by a center-blanked arrow, which is then held by the chuck 28 as shown in FIG. 17(b) and further machined by another type of cutting tool 2a. In such a case, there is a disadvantage of inevitable chucking errors of approximately 5 μm when the workpiece 30 is held again by the chuck 28, causing greater errors in machining precision. This problem is overcome by a position sensor 66 connected to the NC device 60 shown in FIG. 17(c). After the workpiece 30 already machined by a machine tool in a proceeding process is held by the chuck 28, the chucking position is detected by the position sensor 66, the result of which is inputted to the NC device 60. Numerical control data are corrected by the amount of chucking errors in the NC device 60, according to which the workpiece 30 is further machined.

Since the errors caused by chucking operation is eliminated as described above, highly accurate machining is possible even when a workpiece 30 machined by a different machine tool is fed to another machine tool. The position sensor 66 may be provided in plurality so as to detect the position of the workpiece 30 at several points along the periphery thereof, or may be arranged to be movable around the workpiece 30. Reversely, the workpiece 30 may be arranged to be movable while a single position sensor 66 is fixedly mounted. For example, the workpiece 30 may be held and rotated by the chuck rotating means 47 described with reference to FIG. 15.

FIG. 18 shows another arrangement of a machine tool according to the present invention, in which a plurality of chuck means 7 are disposed in the X-axis table 6 in parallel with each other along the X-axis direction. A plurality of rotary drivers 3 are supported by the Z-axis moving means 4 disposed in parallel with each other along the X-axis direction at the same intervals as that of the chuck means 7 in the body frame 1. Alternatively, a plurality of chuck means 7 may be provided in the X-axis table 6 in parallel with each other along the Y-axis direction, as well as a plurality of rotary drivers 3 may be provided to the Z-axis moving means 4 disposed in parallel with each other along the Y-axis direction at the same intervals as that of the chuck means 7.

A plurality of workpieces 30 can be thereby simultaneously machined, contributing to increase in productivity.

Figure 19:
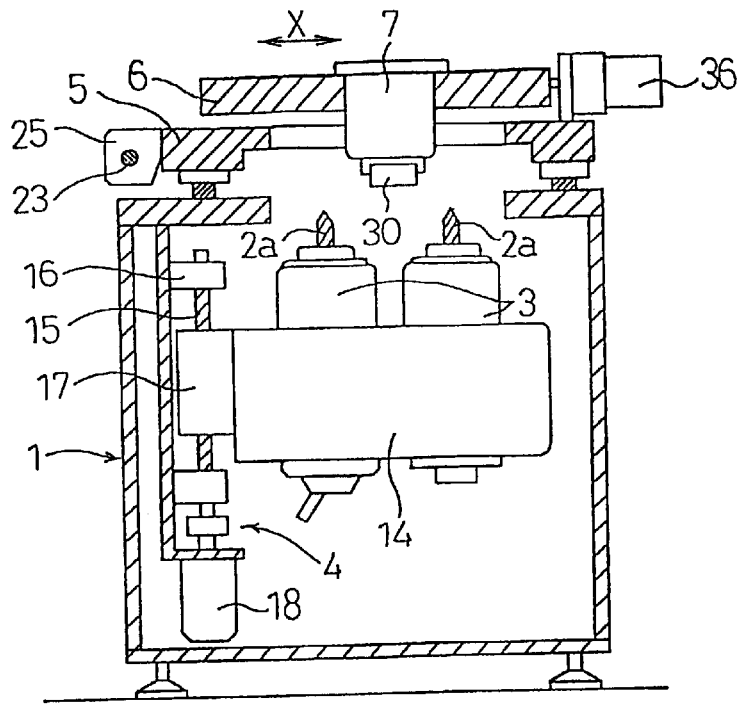
FIG. 19 is a vertical sectional view of a machine tool according to a sixth embodiment of the present invention.

FIG. 19 shows yet another arrangement of the machine tool according to the present invention, in which a single chuck means 7 is disposed in the X-axis table 6, while a plurality of rotary drivers 3 are provided to the Z-axis moving means 4 either along the X-axis or the Y-axis direction. Each rotary driver 3 may be respectively provided with the Z-axis moving means 4, so that each rotary driver 3 can be moved independent of each other along the Z-axis direction. The position sensor 66 mentioned above may be provided to the Z-axis moving means 4 in place of one of the rotary drivers 3.

By providing several different cutting tools 2a at the tips of the different spindles 2 in each rotary driver 3, the workpiece 30 needs to be held by the chuck means 7 only once, and several processes of machining can be done to the workpiece 30 in a single machine tool, contributing to increase in productivity.

Figure 20:
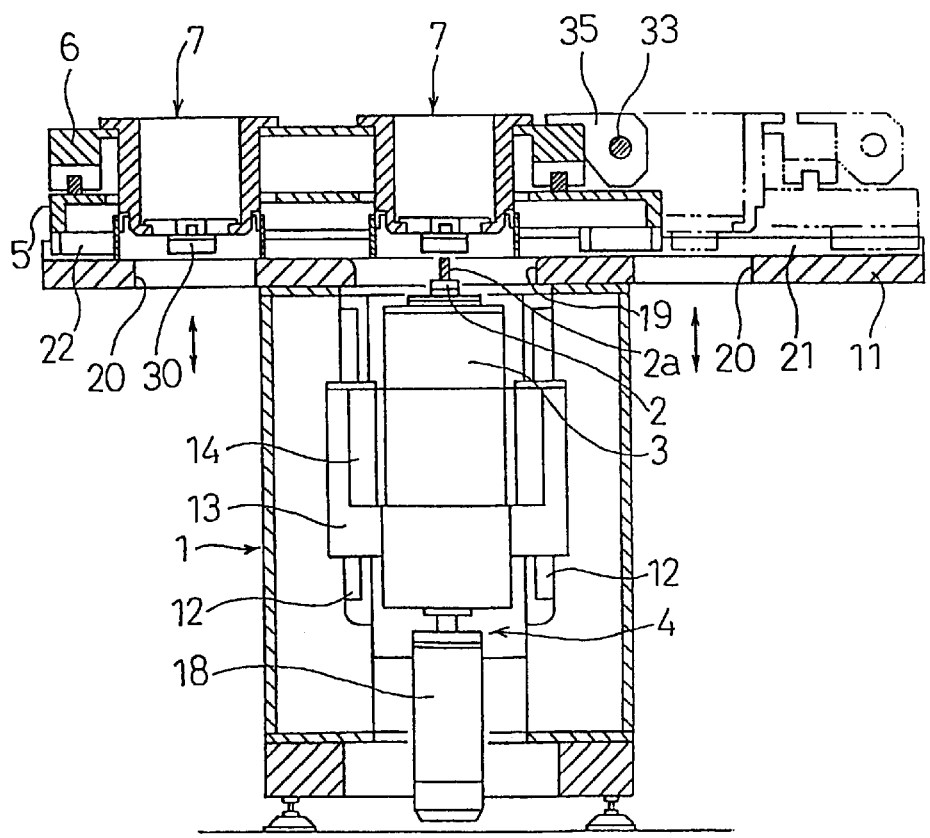
FIG. 20 is a vertical sectional view of a machine tool according to a seventh embodiment of the present invention.
Figure 21A:
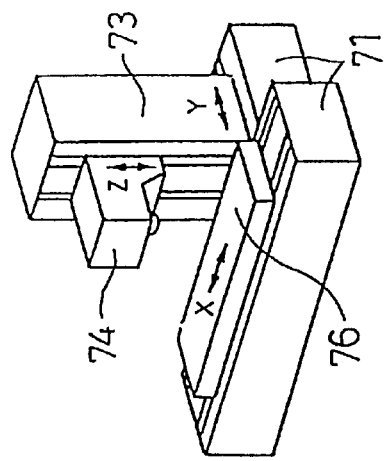
FIGS. 21(a)–(d) are perspective views showing various prior arrangements of a conventional machine tool.
Figure 21B:
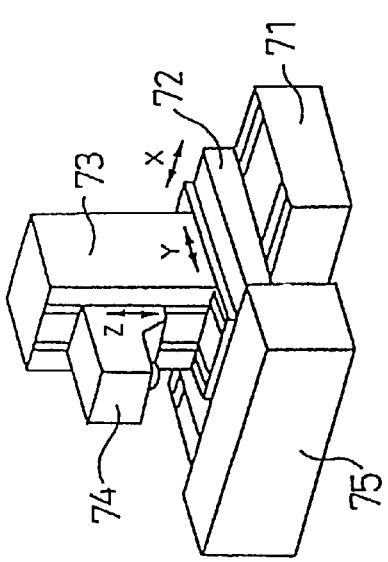
Figure 21C:
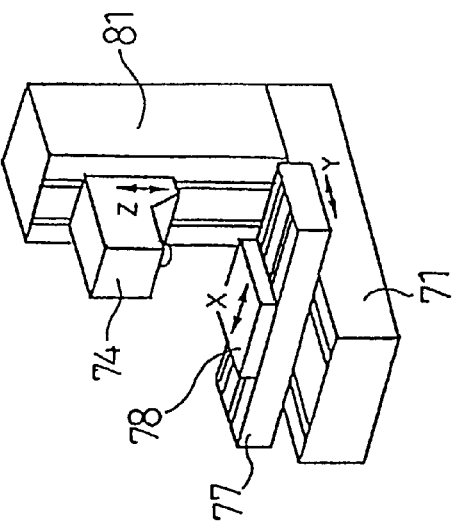
Figure 21D:
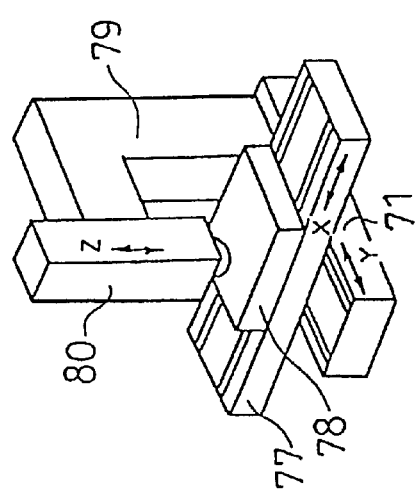

FIG. 20 shows still further arrangement of the machine tool according to the present invention, in which the base plate 11 is laterally projected in the Y-axis direction from both sides of the body frame 1, where the openings 20 are respectively provided, and a pair of chuck means 7 are disposed in the X-axis table 6 in parallel with each other along the Y-axis direction. The Y-axis table 5 is so constructed that it can be transferred between the farthest ends, where one of the chuck means 7 positions above the opening 19 and the other positions above the opening 20 in the projected part of the base plate 11.

This arrangement allows for increase in productivity by reduction of time required for exchanging the workpieces 30, since workpieces 30 can be fed to and received from the chuck means 7 situated above the opening 20 while another workpiece 30 held by another chuck means 7 situated above the opening 19 is being machined.

The base plate 11 may not necessarily be projected to one or either side of the body frame 1 as has been described above, and instead, the body frame 1 may be constructed to have the width of the entire base plate 11, and provided with the transfer means of the workpiece 30 or the relocating means at one or either side thereof. Also, the spindle 2 may be designed to be movable along the X-axis direction as well as the Z-axis direction, and the base plate 11 may be provided only with the Y-axis table 5 with the chuck 28 for holding the workpiece 30. Further, the magnetic radial bearings 52, 53 may be replaced with any non-contact type bearings such as air bearings for rotatably supporting the spindle 2.

It is to be understood that a machine tool designed to have the spindle 2 along a horizontal direction will have the same effects and advantages as those of the present invention described heretofore, in which the spindle 2 is disposed perpendicular to a horizontal plane.

INDUSTRIAL APPLICABILITY

As set forth above, a machine tool according to the present invention realizes highly precise machining yet keeping the entire configuration to be minimized in size, weight, and cost.

Accordingly, the present invention can be advantageously used as a machine tool.

What is claimed:

1. A machine tool, comprising:
    a stationary body frame having an at least partially enclosing structural configuration;
    a spindle with a central axis and fixedly supported at opposed sides within the body frame and located approximately at the center of the body frame;
    an X-axis table and a Y-axis table being respectively movable in X-axis and Y-axis directions provided on a top face or one of four sides of the body frame and therewith in parallel planes which lie orthogonal to the central axis of the spindle in such a manner as to be cumulated on one another; and
    at least one chuck mounted on an upper one of the X-axis table and Y-axis table for holding a workpiece, the spindle being adapted for receivably holding a tool at a distal end of the spindle for machining the workpiece held with the at least one chuck.

2. The machine tool according to claim 1, further comprising:
    guide rails disposed at opposed sides within the body frame; and
    Z-axis moving means which are slidably supported on the guide rails for moving the spindle in the Z-axis direction, said spindle being fixed to said Z-axis moving means.

3. The machine tool according to claim 2, wherein the body frame is constructed to have an approximately U-shaped cross section and the guide rails are disposed in the body frame in such a manner that the entire construction of the machine tool appears approximately symmetrical in a cross section around an axis of symmetry between the guide rails.

4. A machine tool according to any of claims 1 to 3, further comprising a base plate provided on the top face or one of four sides of the body frame, the base plate having an opening therein opposite to the spindle through which operation is carried out, and supporting at least one of the X-axis and Y-axis tables disposed thereon.

5. A machine tool according to claim 4, wherein:
    the base plate includes another opening;
    the X-axis table with said at least one chuck mounted thereto is carried on the Y-axis table; and
    the Y-axis table is movable between a position immediately above the opening in the base plate and a position laterally away therefrom where said another opening is provided through which a workpiece is removed from and fed to the at least one chuck of the Y-axis table.

6. A machine tool according to claim 5, wherein the Y-axis table is retractable to a farthest end of the base plate laterally extending from one side of the body frame a sufficient distance to provide a clear space above the opening in the base plate for operation.

7. A machine tool according to claim 5, wherein the base plate is extended toward at least one of two sides of the body frame, where said another opening is formed for feeding a workpiece to the at least one chuck of the Y-axis table and receiving the same therefrom.

8. A machine tool according to any of claims 1 to 3, further comprising a base plate provided on the top face or one of four sides of the body frame, the base plate having an opening therein opposite to the spindle through which operation is carried out, and at least one of said X-axis and Y-axis tables disposed above the body frame, wherein the spindle is arranged to have the axis thereof along a vertical direction and mounted with a cutting tool at a tip thereof, and the at least one chuck is designed to hold a workpiece downwardly.

9. A machine tool according to any of claims 1 to 3, wherein the spindle is built in a high-speed motor as a rotary driver thereof and rotatably supported by non-contact type bearings.

10. A machine tool according to claim 9, wherein the non-contact type bearings are magnetic radial bearings.

11. A machine tool according to claim 9, further comprising means for correcting errors in machining the workpiece by adjusting a supporting position of the spindle supported by the non-contact type bearings.

12. A machine tool according to claim 1 or 2, further comprising a chuck rotating means for causing the at least one chuck to rotate around the axis thereof.

13. A machine tool according to claim 1 or 2, wherein the body frame is constructed to have an approximately U-shaped cross-section.

14. A machine tool according to claim 1 or 2, further comprising a position sensor for detecting position of the workpiece held by the at least one chuck.

15. A machine tool according to claim 8, further comprising:
- a cutting oil applying means for ejecting cutting oil from one side of the opening toward the workpiece being machined; and
- a collecting hopper for gathering the cutting oil and chips flowing down thereto.

16. A machine tool according to claim 15, further comprising a splash guard hood provided around the chuck means for causing the cutting oil splashing around the workpiece being machined to flow down into the collecting hopper.

17. A machine tool according to claim 16, further comprising sealing means to seal a gap between the splash guard hood and the collecting hopper while allowing a respective movement with each other therebetween.

18. A machine tool according to claim 15, further comprising:
- a collecting duct; and
- a collecting fluid applying means for ejecting a collecting fluid toward into the collecting hopper, which is connected to the collecting duct.

19. A machine tool, comprising:
- a stationary body frame having an at least partially enclosing structural configuration;
- a spindle with a central axis and fixedly supported at opposed sides within the body frame and located approximately at the center of the body frame;
- an X-axis table and a Y-axis table being respectively movable in X-axis and Y-axis directions provided on a top face or one of four sides of the body frame and therewith in parallel planes which lie orthogonal to the central axis of the spindle in such a manner as to be cumulated on one another;
- at least one chuck mounted on an upper one of the X-axis table and Y-axis table for holding a workpiece, the spindle being adapted for receivably holding a tool at a distal end of the spindle for machining the workpiece held with the at least one chuck;
- a base plate provided on the top face or one of four sides of the body frame, the base plate having an opening therein opposite to the spindle through which operation is carried out, and at least one of said X-axis and Y-axis tables disposed above the body frame, wherein the spindle is arranged to have the axis thereof along a vertical direction and mounted with a cutting tool at a tip thereof, and the at least one chuck is designed to hold a workpiece downwardly;
- cutting oil applying means for ejecting cutting oil from one side of the opening toward the workpiece being machined;
- a collecting hopper for gathering the cutting oil and chips flowing down thereto;
- collecting fluid applying means for ejecting a collecting fluid toward into the collecting hopper, which is connected to a collecting duct; and
- the collecting hopper being arranged eccentrical with respect to the opening in the base plate, and the collecting fluid applying means being disposed in such a way that the collecting fluid is blown from one side where a gap between the periphery of a rotary driver for rotating the spindle and the collecting hopper is narrow toward another side wide is more widely gapped, where the collecting duct is connected to the collecting hopper.

20. A machine tool according to claim 19, further comprising vacuum sucking means, the collecting duct connected to the collecting hopper being further connected to the vacuum sucking means.

21. A machine tool according to claim 15, wherein the cutting oil applying means comprises at least three cutting oil ejecting nozzles disposed to surround the workpiece being machined.

22. A machine tool according to claim 21, further comprising an on-off controller for controlling ejection of the cutting oil from each cutting oil ejecting nozzle in accordance with a position of the workpiece.

23. A machine tool according to claim 1 or 2, wherein a corner of a workpiece having a given radius is machined by numerical control using a cutting tool designed to machine another corner of the workpiece having a minimum radius.

24. A machine tool according to claim 1 or 2, wherein a plurality of spindles are arranged in the body frame, and a plurality of chucks are disposed on at least one of the X-axis and Y-axis tables.

25. A machine tool according to claim 1 or 2, wherein the spindle is provided in the body frame in singularity while a plurality of chucks are disposed on at least one of the X-axis and Y-axis tables.

26. A machine tool according to claim 1 or 2, wherein a plurality of spindles are arranged in the body frame while the at least one chuck is disposed on one of the X-axis and Y-axis tables in singularity.

27. A machine tool, comprising:
- a stationary body frame having an at least partially enclosing structural configuration;
- a spindle with a central axis and fixedly supported at opposed sides within the body frame and located approximately at the center of the body frame;
- an X-axis table and a Y-axis table being respectively movable in X-axis and Y-axis directions provided on a top face or one of four sides of the body frame and therewith in parallel planes which lie orthogonal to the central axis of the spindle in such a manner as to be cumulated on one another; and
- at least one chuck mounted on an upper one of the X-axis table and Y-axis table for holding a workpiece, the spindle being adapted for receivable holding a tool at a distal end of the spindle for machining the workpiece held with the at least one chuck;

a base plate provided on the top face or one of four sides of the body frame, the base plate having an opening therein opposite to the spindle through which operation is carried out, and supporting at least one of the X-axis and Y-axis tables disposed thereon, the base plate including at least another opening, the X-axis table with said at least one chuck mounted thereto being carried on the Y-axis table, the Y-axis table being movable between a position immediately above the opening in the base plate and a position laterally away therefrom where said another opening is provided through which the workpiece is removed from and fed to the at least one chuck of the Y-axis table; and said at least one chuck includes a pair of chucks disposed in the X-axis table in parallel with each other along the Y-axis direction, and the Y-axis table is arranged to be movable between farthest ends where one of the pair of chucks positions just above the opening in the base plate, said at least another opening in the base plate including a pair of another openings through which the workpiece is removed from and fed to another of the pair of chucks when the Y-axis table is located at a given one of said farthest ends.

* * * * *

UNITED STATES PATENT AND TRADEMARK OFFICE
CERTIFICATE OF CORRECTION

PATENT NO. : 6,220,799 B1
DATED : April 24, 2001
INVENTOR(S) : Norio Okutani et al.

It is certified that error appears in the above-identified patent and that said Letters Patent is hereby corrected as shown below:

Title page,
Please change the PCT No. from "PCT/JP97/02595" to -- PCT/JP97/02585 --.

Signed and Sealed this

Eleventh Day of December, 2001

Attest:

NICHOLAS P. GODICI
Attesting Officer
Acting Director of the United States Patent and Trademark Office